US011606021B2

United States Patent
Nosaka et al.

(10) Patent No.: US 11,606,021 B2
(45) Date of Patent: Mar. 14, 2023

(54) POWER CONVERTER APPARATUS PROVIDED WITH LOW-PASS FILTER CIRCUIT FOR REDUCING SWITCHING FREQUENCY COMPONENTS

(71) Applicant: OMRON Corporation, Kyoto (JP)

(72) Inventors: Noriyuki Nosaka, Nara (JP); Takeo Nishikawa, Kyoto (JP); Wataru Okada, Kizugawa (JP); Satoshi Iwai, Hirakata (JP); Takanori Ishii, Uji (JP); Gun Eto, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 116 days.

(21) Appl. No.: 17/259,521

(22) PCT Filed: Mar. 11, 2019

(86) PCT No.: PCT/JP2019/009560
§ 371 (c)(1),
(2) Date: Jan. 11, 2021

(87) PCT Pub. No.: WO2020/017091
PCT Pub. Date: Jan. 23, 2020

(65) Prior Publication Data
US 2021/0273553 A1     Sep. 2, 2021

(30) Foreign Application Priority Data
Jul. 19, 2018   (JP) .............................. JP2018-136175

(51) Int. Cl.
*H02M 1/14*     (2006.01)
*H02M 1/12*     (2006.01)
*H02M 3/158*    (2006.01)

(52) U.S. Cl.
CPC ............. *H02M 1/14* (2013.01); *H02M 1/126* (2013.01); *H02M 3/1584* (2013.01)

(58) Field of Classification Search
CPC ................................................ H02M 1/14–26
See application file for complete search history.

(56) References Cited

U.S. PATENT DOCUMENTS

| | | | |
|---|---|---|---|
| 11,329,546 B2 * | 5/2022 | Nosaka ................. | H02M 3/015 |
| 2014/0111176 A1 | 8/2014 | Nishimura | |
| 2017/0063216 A1 | 3/2017 | Fujiwara et al. | |

FOREIGN PATENT DOCUMENTS

| | | |
|---|---|---|
| CN | 202872643 U | 4/2013 |
| DE | 102008040722 A1 | 1/2010 |

(Continued)

OTHER PUBLICATIONS

EPO Extended European Search Report for corresponding EP Application No. 19837418.3; dated Mar. 4, 2022.

(Continued)

*Primary Examiner* — Peter M Novak
(74) *Attorney, Agent, or Firm* — Cantor Colburn LLP

(57) ABSTRACT

A power converter apparatus includes a switching circuit generating an AC voltage by switching a DC voltage at a predetermined switching frequency, and a filter circuit converting the AC voltage from the switching circuit into the DC voltage by low-pass filtering the AC voltage. The filter circuit includes first and second bypass capacitors, and an inductor. The first bypass capacitor bypasses noise of a first frequency component of the AC voltage from the switching circuit, and the second bypass capacitor bypasses noise of a second frequency component of the AC voltage from the switching circuit, which is lower than the first frequency component. The inductor is between the first and second bypass capacitors, and the inductance thereof is set so that a resonance frequency of the filter circuit is lower than (Continued)

multiple times the switching frequency by insertion of the inductor, thereby reducing the switching noise flowing to the load.

4 Claims, 12 Drawing Sheets

(56) References Cited

FOREIGN PATENT DOCUMENTS

| JP | 10109811 A | 4/1989 |
|---|---|---|
| JP | 2012094291 A | 5/2012 |
| JP | 2014103842 A | 6/2014 |
| JP | 2015180139 A | 10/2015 |
| JP | 6207751 B2 | 10/2017 |

OTHER PUBLICATIONS

Schaffner Group: "EMC/EMI Filter Design with RB Common-Mode Chokes", Dec. 31, 2013 (Dec. 31, 2013), XP055454944, Retrieved from the Internet: URL:https://www.Schaffner.com/fileadmin/media/downloads/application_note/Schaffner_AN_RB_common_chockes.pdf [retrieved on Feb. 27, 2018] 22 pages.
International Search Report of International Application PCT/JP2019/009560; dated May 21, 2019.
Written Opinion of the International Searching Authority for International Application No. PCT/JP2019/009560; dated May 21, 2019.

* cited by examiner

"PRIOR ART"

"PRIOR ART"

ND LOW-PASS FILTER
POWER CONVERTER APPARATUS PROVIDED WITH LOW-PASS FILTER CIRCUIT FOR REDUCING SWITCHING FREQUENCY COMPONENTS

CROSS REFERENCE TO RELATED APPLICATIONS

This is the U.S. national stage of application No. PCT/JP2019/009560, filed on Mar. 11, 2019. Priority under 35 U.S.C. § 119(a) and 35 U.S.C. § 365(b) is claimed from Japanese Application No. 2018-136175, filed Jul. 19, 2018, the disclosure of which is also incorporated herein by reference.

TECHNICAL FIELD

The present invention relates to a power converter apparatuses, examples including DC/DC converter, for example.

BACKGROUND ART

In a power converter apparatus that performs power conversion by performing on/off control of a switching device, the switching frequency of 20 kHz or more causes high-frequency switching noise generates due to the rapidly changing state of the switching device. As a result of the noise, failures such as malfunction or function stopping of electronic equipment occurs.

For example, FIG. 9 illustrates a configuration of a power converter apparatus 101 according to Conventional Example 1 as disclosed in Patent Document 1. Referring to FIG. 9, the power converter apparatus 101 includes a power supply filter circuit 110 and a voltage converter circuit 120. In this case, the power supply filter circuit 110 includes a first filter circuit 111 including a capacitor 111a, and a second filter circuit 112 including a series circuit of a capacitor 112a and resistor 112b, the filter circuit 111 and the second filter circuit 112 being connected in parallel. In addition, the voltage converter circuit 120 includes a switching circuit 121 including switching devices 121a and 121b, and a low-pass filter 122 including a coil 122a and a capacitor 122b.

It has been known that high-frequency ringing noise (100 MHz to a few 100 MHz) generates in a frequency band in the output of a prior art power converter apparatus due to an influence of a parasitic inductance thereof. In the power converter apparatus according to Conventional Example 1 shown in FIG. 9, the first filter circuit 111 including a bulk capacitor 111a having a large capacitance, and the second filter circuit 112 having a small capacitance capacitor 112a for noise suppression are added to reduce high frequency noise. This results in stabilization of a drive pulse signal and reduction of high frequency noise.

In addition, in the power converter apparatus according to Conventional Example 2 disclosed in Patent Document 2, a high-frequency bypass capacitor and a low-frequency bypass capacitor, which are provided in a rear stage of a switching circuit, are connected with a relatively small inductance. As a result, the power converter apparatus can operate within a high frequency region having relatively little switching noise.

PRIOR ART DOCUMENTS

Patent Documents

[Patent Document 1] Japanese Patent Laid-open Publication No. JP2014-103842A; and
[Patent Document 2] Japanese Patent No. JP6207751B1.

SUMMARY OF THE INVENTION

Problems to be Solved by the Invention

However, in Conventional Example 2, there are a parasitic inductance inevitably due to wiring (hereinafter, referred to as a wiring inductance) between the high-frequency bypass capacitor and the low-frequency bypass capacitor. Therefore, a resonance phenomenon occurs due to these LC circuits.

FIG. 10 is a graph illustrating a relation between the resonance frequency fr and the wiring inductance for describing a problem to be solved by the present invention. As illustrated in FIG. 10, the wiring inductance decreases as the resonance frequency fr changes from switching frequency $f_{SW}$ toward an upper limit frmax of the resonance frequency. However, there has been such a problem that switching noise is further amplified by a resonance phenomenon in a case where the resonance frequency fr and the switching frequency $f_{SW}$ match each other.

In addition, it is predicted that, in the future, next-generation power devices will operate at higher frequencies, increasing the noise level in a high frequency region.

SUMMARY OF THE INVENTION

An object of the present invention is to solve the above problems and to provide a power converter apparatus capable of reliably reducing switching noise in the power converter apparatus as compared with the prior art.

According to one aspect of the present invention, there is provided a power converter apparatus including at least one switching device, and a filter circuit. The at least one switching circuit generates an alternating current (AC) voltage by switching a direct current (DC) voltage at a predetermined switching frequency ($f_{SW}$), and the filter circuit converts the AC voltage from the switching circuit into a DC voltage by low-pass filtering the AC voltage, and outputs the DC voltage to a load. The filter circuit includes first and second bypass capacitors, and at least one inductor. The first bypass capacitor bypasses noise of a first frequency component of the AC voltage from the switching circuit, and the second bypass capacitor bypasses noise of a second frequency component of the AC voltage from the switching circuit. The second frequency component is lower than the first frequency component of the AC voltage from the switching circuit. The at least one inductor is inserted between the first bypass capacitor and the second bypass capacitor. The inductance (L) of the inductor is set so that a resonance frequency ($f_r$) of the filter circuit is lower than multiple times the switching frequency ($f_{SW}$) by insertion of the inductor.

Effect of the Invention

Therefore, according to the power converter apparatus of the present invention, it is possible to avoid complication of a circuit configuration, reliably reduce the switching noise in the power converter apparatus, and operate with a higher efficiency than that of the prior art.

MODES FOR CARRYING OUT THE INVENTION

Figure 1A:
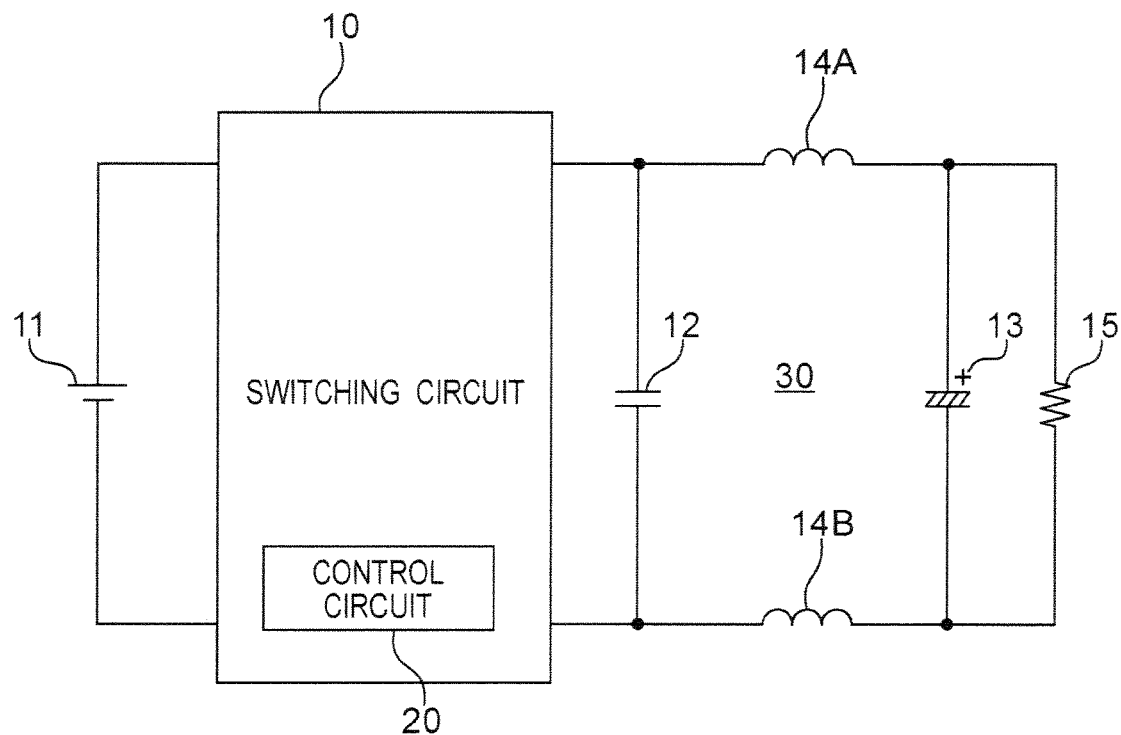
FIG. 1A is a circuit diagram illustrating a configuration example of a power converter apparatus according to a first embodiment.

Embodiments according to the present invention will be described below with reference to the drawings. It should be noted that, in each of the following embodiments, similar components are denoted by the same reference characters.

First Embodiment

FIG. 1A is a circuit diagram illustrating a configuration example of a power converter apparatus according to a first embodiment. Referring to FIG. 1A, the power converter apparatus according to the first embodiment is inserted between a direct current (DC) voltage source 11 and a load 15. The power converter apparatus includes a switching circuit 10 and a filter circuit 30. The switching circuit 10 generates an alternating current (AC) voltage by switching the DC voltage from the DC voltage source 11 at a predetermined switching frequency ($f_{SW}$), and outputs the AC voltage to the filter circuit 30. Next, the filter circuit 30 low-pass filters the AC voltage from the switching circuit to convert the AC voltage into a DC voltage, and outputs the DC voltage to the load 15.

The switching circuit 10 includes a switching device that switches the DC voltage, and a control circuit 20 that generates a drive signal for driving the switching device with on/off control in a predetermined duty cycle.

The filter circuit 30 includes bypass capacitors 12 and 13 and inductors 14A and 14B. The AC voltage from the switching circuit 10 is applied to both of the ends of the bypass capacitor 12, and one end of the bypass capacitor 12 is connected to one end of the bypass capacitor 13 via the inductor 14A. Another end of the bypass capacitor 12 is connected to another end of the bypass capacitor 13 via the inductor 14B. In this case, the bypass capacitor 12 bypasses switching noise of a first frequency component (relatively high frequency component) of the AC voltage from the switching circuit 10. The bypass capacitor 13 bypasses noise of a second frequency component (relatively low frequency component) of the AC voltage from the switching circuit 10, the second frequency component being lower than the first frequency component of the AC voltage from the switching circuit 10. The combined inductance (L) of the inductors 14A and 14B is set such that the resonance frequency $f_r$ by the filter circuit 30 is lower than multiple times the switching frequency $f_{SW}$ by insertion of the inductors 14A and 14B.

That is, in the present embodiment, where $C_1$ represents a capacitance of the bypass capacitor 12, and $C_2$ represents a capacitance of the bypass capacitor 13, the switching frequency $f_{SW}$ and the resonance frequency ($f_r$) are set to satisfy the following equation:

$$f_{SW} \times N > fr = \frac{1}{2\pi\sqrt{L \times \frac{C_1 \times C_2}{C_1 + C_2}}}. \qquad \text{[Equation 1]}$$

In this case, N is an integer or natural number, which is larger than two, and is a multiple number. In the present embodiment, one of the two inductors 14A and 14B may be deleted. In addition, the inductors 14A and 14B may be at least one of a wiring inductor, a mounted inductor, and a mounted coil.

In the power converter apparatus configured as described above, the bypass capacitors 12 and 13 are connected between a power supply line, which is between the switching circuit 10 and the load 15, and a ground line in order to avoid fluctuation in the DC voltage of the DC voltage source 11 when the power converter apparatus operates. In this case, the bypass capacitor 12 has a role of returning a high-frequency switching noise component generated from the switching circuit 10, and the bypass capacitor 13 has a role of returning a low-frequency switching noise component. The inductors 14A and 14B have a role of reducing the resonance frequency between the bypass capacitors 12 and 13. It should be noted that the bypass capacitors 12 and 13 may be one which is configured to include a plurality of capacitors connected in parallel or in series in order to satisfy respective capacitances.

As described above, according to the power converter apparatus of the present embodiment, it is possible to avoid a complicated circuit configuration, reliably reduce switching noise in the power converter apparatus as compared with the prior art, and operate the power converter apparatus with a higher efficiency. In this case, it is possible to select a part having a relatively small ripple as a capacitor to be inserted, suppress the overcurrent by inserting an inductor, and have a radiator of a switching device smaller than the radiator of the prior art.

It should be noted that a modified embodiment of the first embodiment can also be applied to second to fifth embodiments.

Modified Embodiment of First Embodiment

Figure 1B:
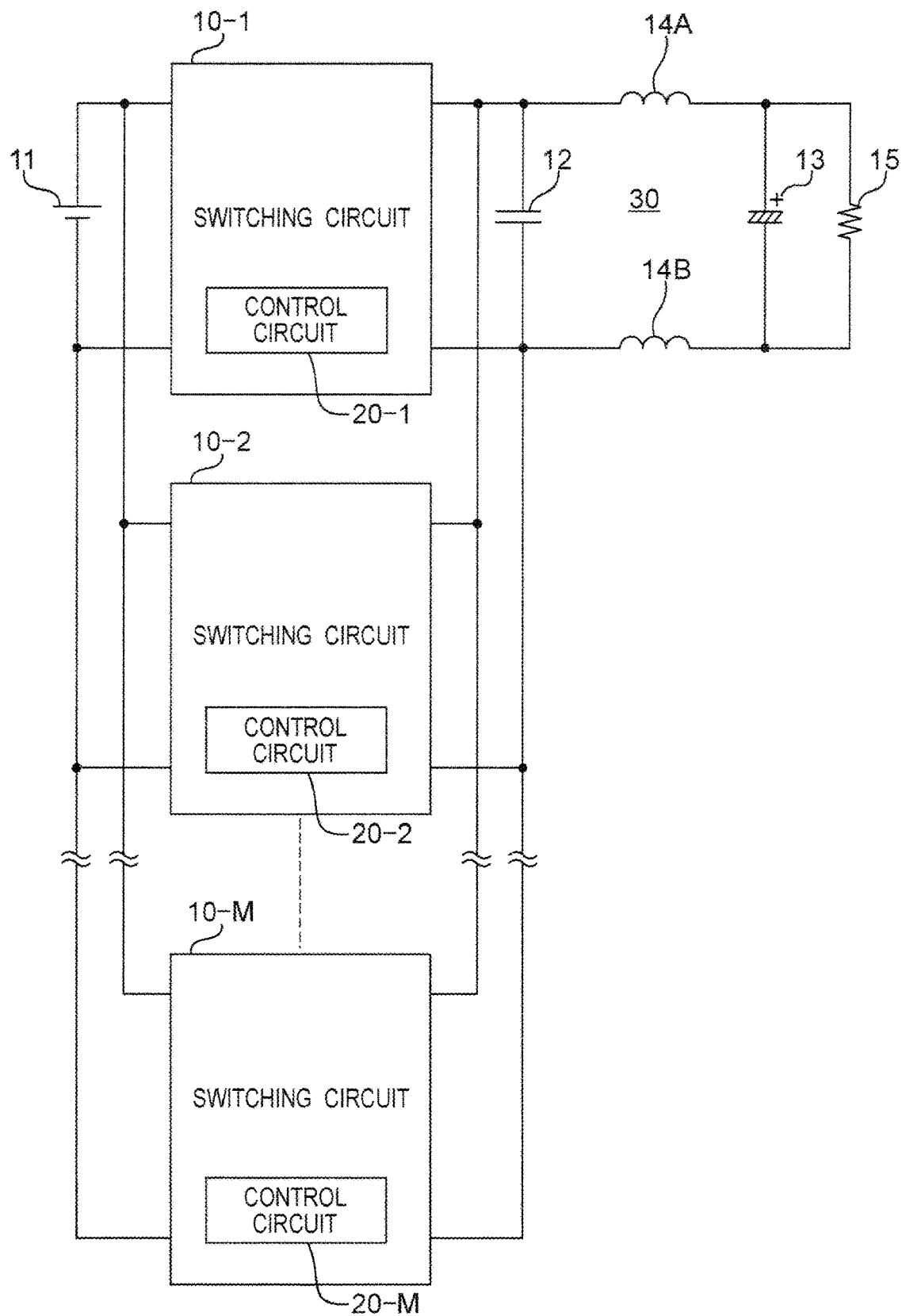
FIG. 1B is a circuit diagram illustrating a configuration example of a power converter apparatus according to a modified embodiment of the first embodiment.

FIG. 1B is a circuit diagram illustrating a configuration example of a power converter apparatus according to the modified embodiment of the first embodiment. The power converter apparatus of FIG. 1B differs from the power converter apparatus of FIG. 1A in the following point.

(1) Instead of one switching circuit 10, a plurality of M number of switching circuits 10-1 to 10-M is included. Each of the switching circuits 10-1 to 10-M may separately include each of control circuits 20-1 to 20-M that generate a drive signal for driving a switching device, or one control circuit may drive each switching device of a plurality of switching circuits 10-1 to 10-M.

The power converter apparatus according to the modified embodiment of the first embodiment configured as described above has an action and advantageous effects similar to those of the power converter apparatus according to the first embodiment.

Second Embodiment

Figure 2:
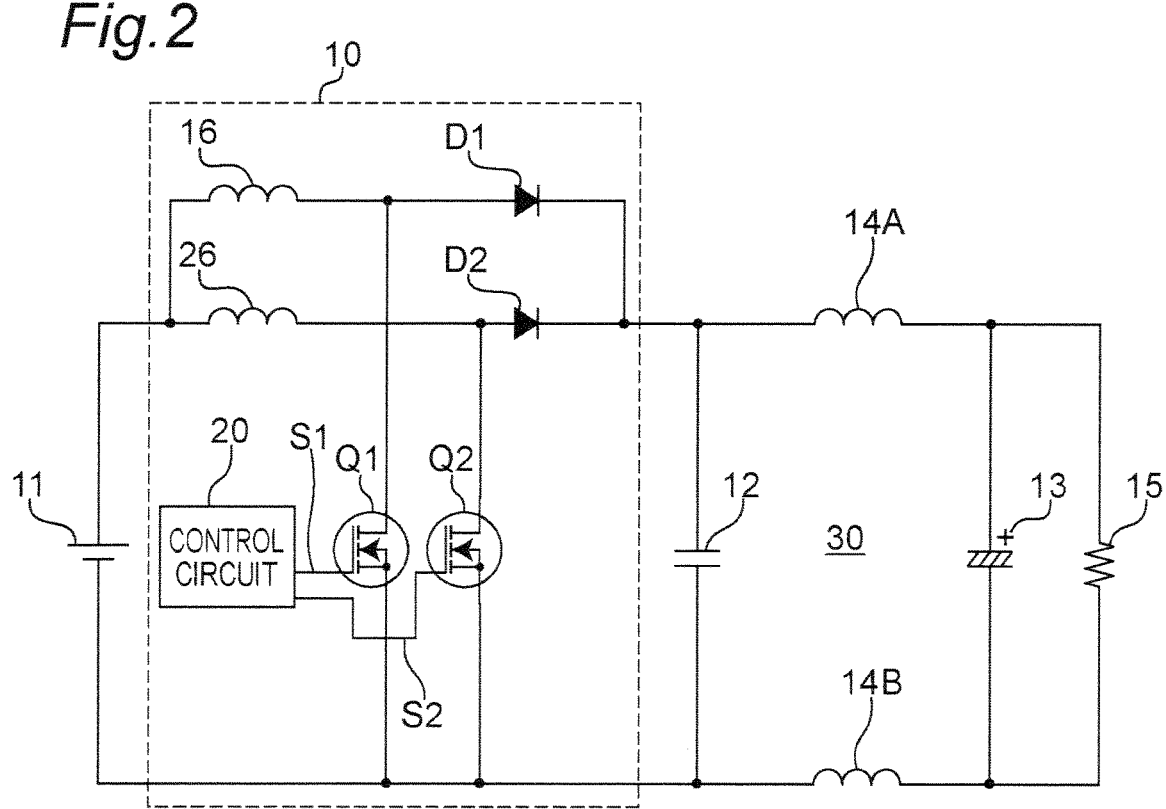
FIG. 2 is a circuit diagram illustrating a configuration example of an asynchronous power converter apparatus having a step-up function according to a second embodiment.

FIG. 2 is a circuit diagram illustrating a configuration example of an asynchronous power converter apparatus having a step-up function according to a second embodiment. The power converter apparatus according to the second embodiment illustrates a circuit configuration of a switching circuit 10 in detail as compared with the power converter apparatus of FIG. 1, and only differences will be described below.

Referring to FIG. 2, the switching circuit 10 includes a step-up reactor 16, a switching device Q1 constituted of, for example, a MOSFET, an IGBT, or the like, a diode D1, and a control circuit 20. The DC voltage from the DC voltage source 11 is applied to both of the ends of the drain and source of the switching device Q1 via a reactor 16, and the drain of the switching device Q1 is connected to one end of a bypass capacitor 12 via the diode D1. The control circuit 20 generates a drive signal S1 for driving the switching device Q1 with on/off control in a predetermined duty cycle, and applies the drive signal S1 to a gate of the switching device Q1.

The power converter apparatus according to the second embodiment configured as described above has an action and advantageous effects similar to those of the power converter apparatus according to the first embodiment, except for having an asynchronous step-up function.

Third Embodiment

Figure 3:
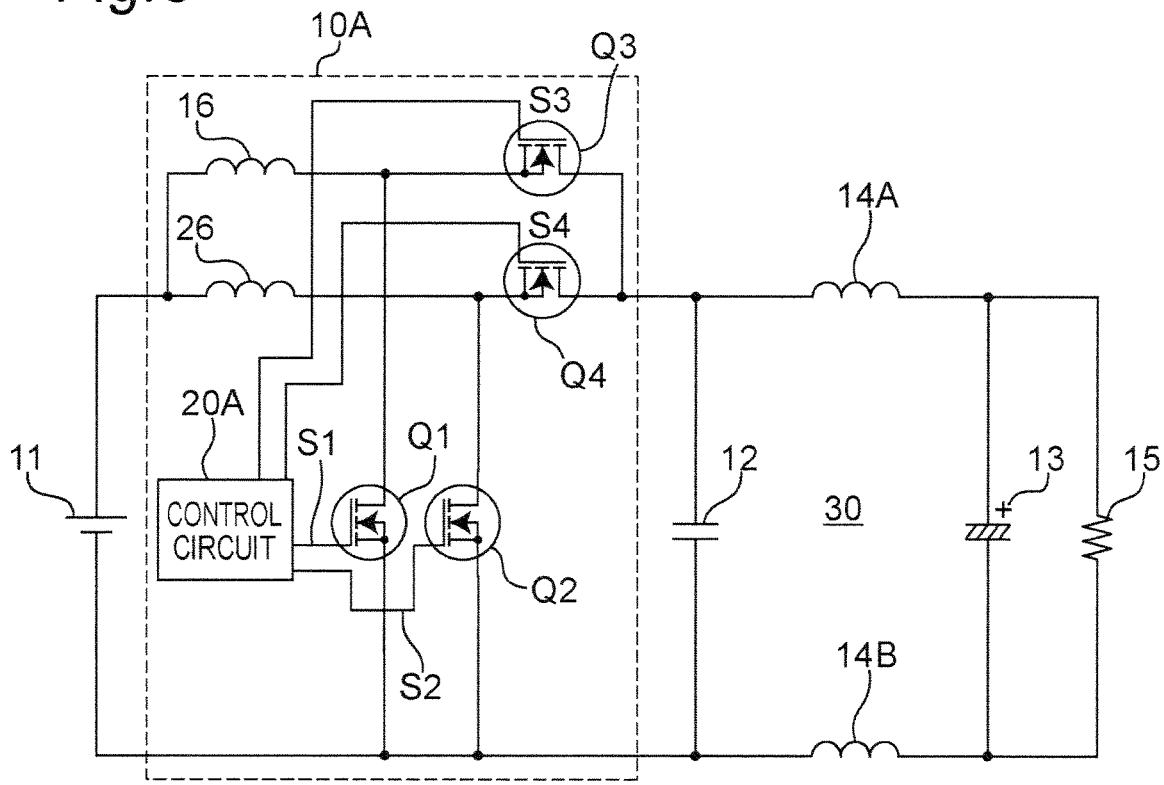
FIG. 3 is a circuit diagram illustrating a configuration example of a synchronous power converter apparatus having a step-up function according to a third embodiment.

FIG. 3 is a circuit diagram illustrating a configuration example of a synchronous power converter apparatus having a step-up function according to a third embodiment. The power converter apparatus according to the third embodiment differs from the power converter apparatus of FIG. 2 in the following points:

(1) instead of the switching circuit 10, a switching circuit 10A is included; and (2) the switching circuit 10A includes a step-up reactor 16, switching devices Q1 and Q2, which are each configured to include, for example, a MOSFET, an IGBT, or the like, and a control circuit 20A.

Referring to FIG. 3, the DC voltage from the DC voltage source 11 is applied to both ends of the drain and source of the switching device Q1 via a reactor 16, and the drain of the switching device Q1 is connected to one end of the bypass capacitor 12 via the source and drain of the switching device Q2. The control circuit 20A generates drive signals S1 and S2 for driving the switching devices Q1 and Q2 with on/off control in a predetermined duty cycle and in synchronization in periods different from each other, and applies the drive signals S1 and S2 to the gate of the switching device Q1.

The power converter apparatus according to the third embodiment configured as described above has an action and advantageous effects similar to those of the power converter apparatus according to the second embodiment, except for having a synchronous step-up function.

Fourth Embodiment

Figure 4:
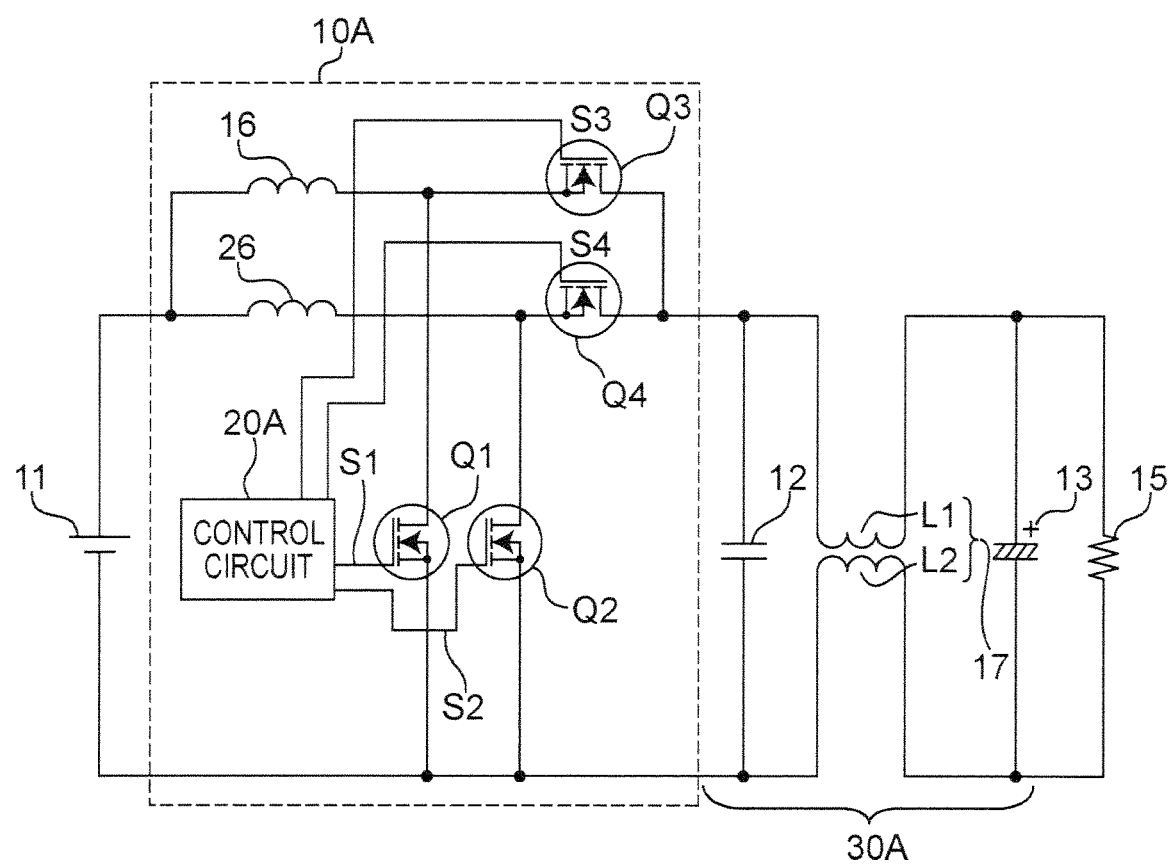
FIG. 4 is a circuit diagram illustrating a configuration example of a synchronous power converter apparatus having a step-up function according to a fourth embodiment.

FIG. 4 is a circuit diagram illustrating a configuration example of a synchronous power converter apparatus having a step-up function according to a fourth embodiment. The power converter apparatus according to the fourth embodiment differs from the power converter apparatus of FIG. 3 in the following points:

(1) instead of the inductor 14A, a first inductor L1 of a common mode choke coil (CMC) 17 is included; and (2) instead of the inductor 14B, a second inductor L2 of the common mode choke coil (CMC) 17 is included.

In this case, the common mode choke coil (CMC) 17 is provided particularly for removing common mode noise. It should be noted that two inductors L1 and L2 may be provided instead of the common mode choke coil (CMC) 17. In addition, the two inductors L1 and L2 may include a leakage inductance of the common mode choke coil (CMC).

The power converter apparatus according to the fourth embodiment configured as described above has an action and advantageous effects similar to those of the power converter apparatus according to the second embodiment, except for having a synchronous step-up function.

Fifth Embodiment

Figure 5:
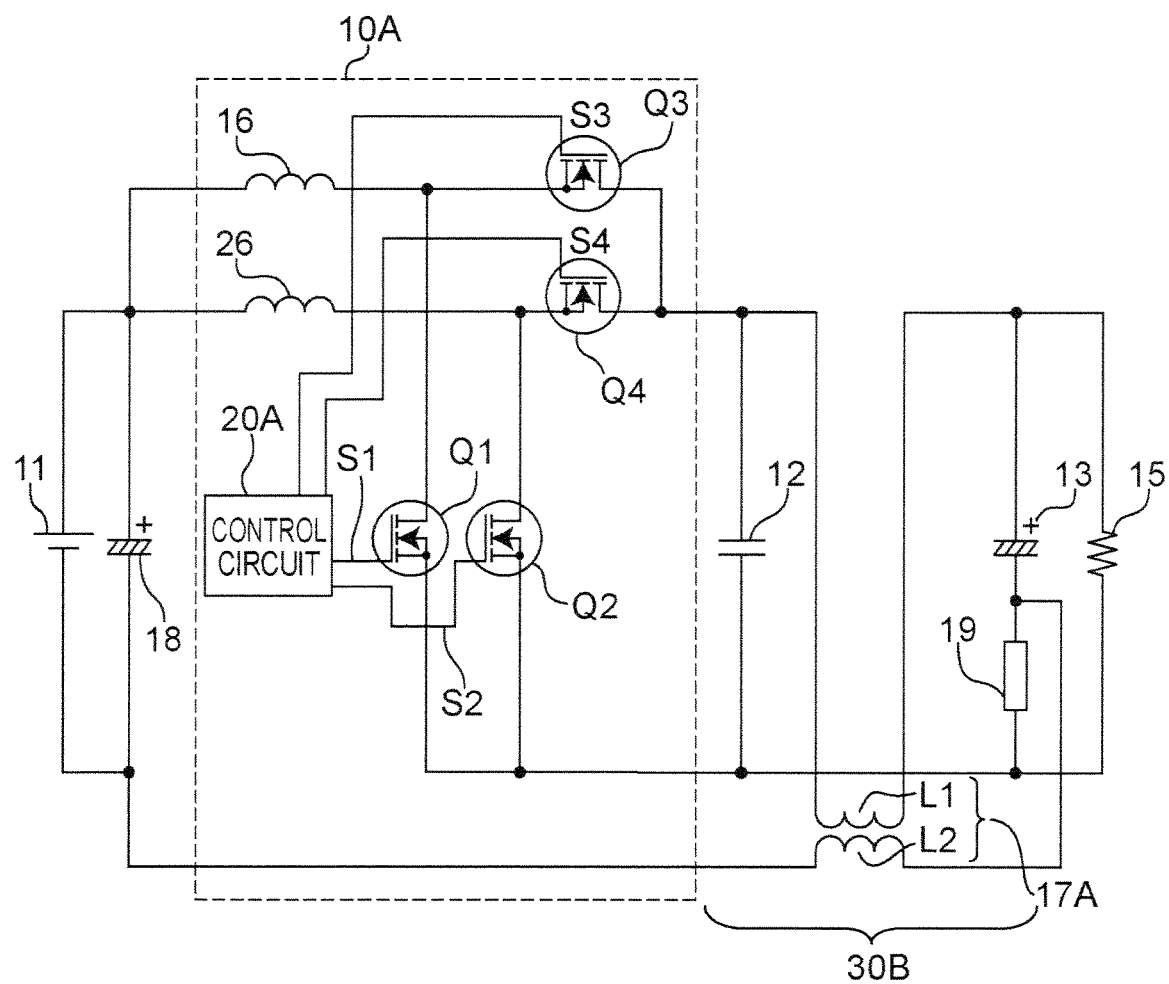
FIG. 5 is a circuit diagram illustrating a configuration example of a synchronous power converter apparatus having a step-up function according to a fifth embodiment.

FIG. 5 is a circuit diagram illustrating a configuration example of a synchronous power converter apparatus having a step-up function according to a fifth embodiment. The power converter apparatus according to the fifth embodiment differs from the power converter apparatus of FIG. 4 in the following points:

(1) a bypass capacitor 18 connected in parallel with the DC voltage source 11 is further included;

(2) another end of the bypass capacitor 13 is connected to the ground side of a load 15 via a fuse 19 that is blown when a current which is larger than a predetermined threshold current flows; and (3) another end of the bypass capacitor 18 on the ground side is connected to the connection point between the bypass capacitor 13 and the fuse 19 via the second inductor L2 of a common mode choke coil (CMC) 17.

In the power converter apparatus configured as described above, it is possible to suppress the overcurrent in the bypass capacitors 13 and 18 by adding the fuse 19. By providing the common mode choke coil (CMC) 17, it is possible to reduce the resonance frequency in the resonant circuit configured to include the combination of inductors L1 and L2 included in the common mode choke coil (CMC) 17 with each of bypass capacitors 12 and 13. The other action and advantageous effects of the present embodiment are similar to those of the fourth embodiment.

Implementation Examples

Figure 6:
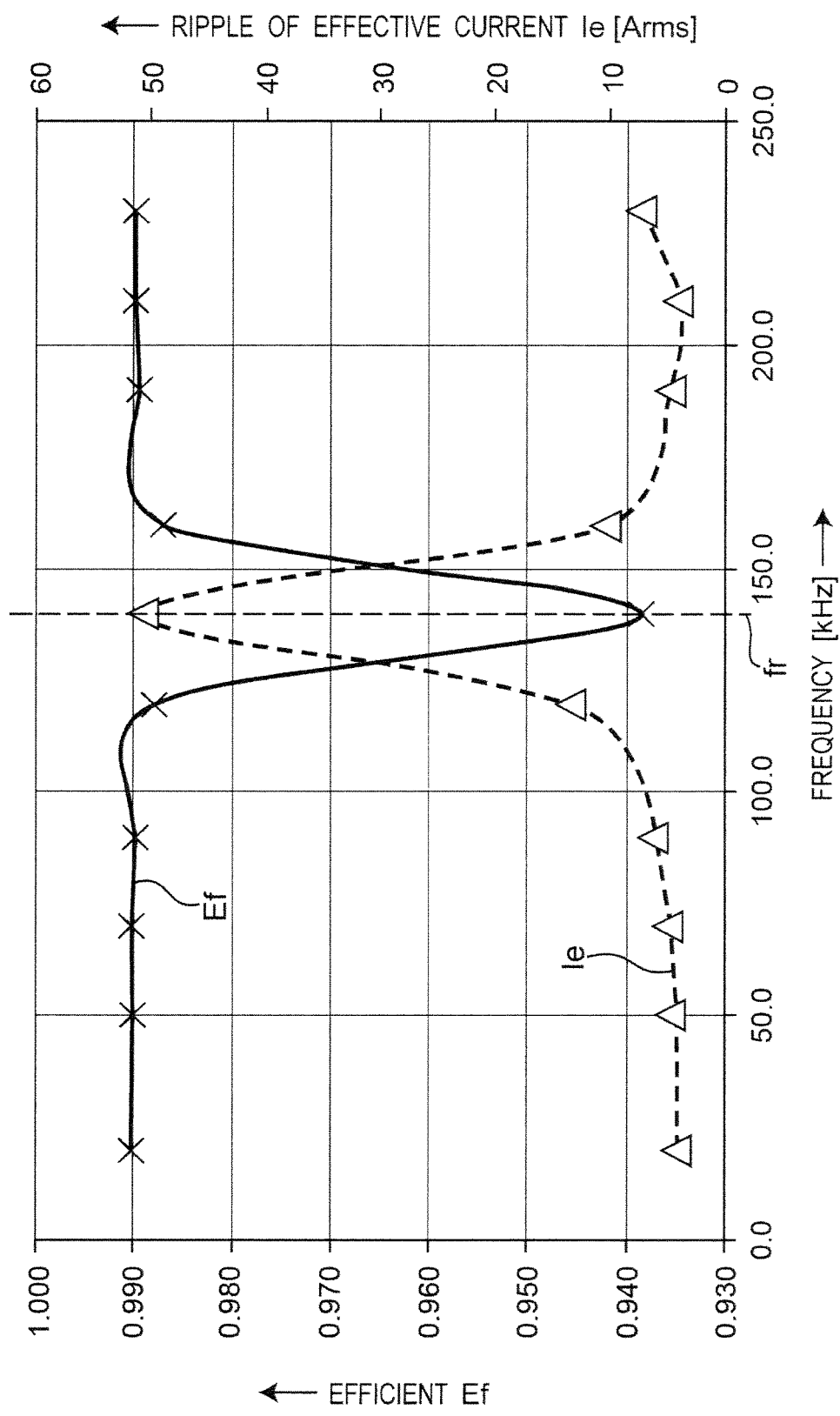
FIG. 6 is a graph of simulation results of the power converter apparatus of FIG. 3 and illustrating frequency characteristics of an efficiency Ef and a ripple Ie of an effective current.

FIG. 6 is a graph of simulation results of the power converter apparatus of FIG. 3 and illustrating frequency characteristics of an efficiency Ef and a ripple Ie of an effective current. The present inventors performed a simulation for confirming the effect of the resonance suppression with a circuit simulator (software name: Simetrix) by using the circuit configuration of the power converter apparatus according to the third embodiment of FIG. 3. Table 1 below illustrates conditions of the simulation.

TABLE 1

| Item | Numerical Value |
|---|---|
| Voltage of DC voltage source 11 | 100 V |
| Switching frequency $f_{SW}$ | 70 kHz |
| Bypass capacitor 12 | 2.2 nF |
| Bypass capacitor 13 | 131 μF |
| Inductors 14A and 14B | 0.21 pH to 28.8 pH (Variable) |
| Load 15 | 68.2 Ω |

The resonance frequency $f_r$ was changed by changing the combined inductance value of the inductors 14A and 14B. By setting the resonance frequency $f_r$ to be lower than multiple times the switching frequency $f_{SW}$, reduction of the ripple Ie and increase in the efficiency Ef were confirmed. As is apparent from FIG. 7, it is shown that when $f_r=f_{SW}$, the efficiency Ef decreases and the ripple Ie of the effective current increases, and that by setting $f_r<f_{SW}$, the efficiency Ef increases and the ripple Ie of the effective current decrease as compared with that when $f_r=f_{SW}$.

Figure 7:
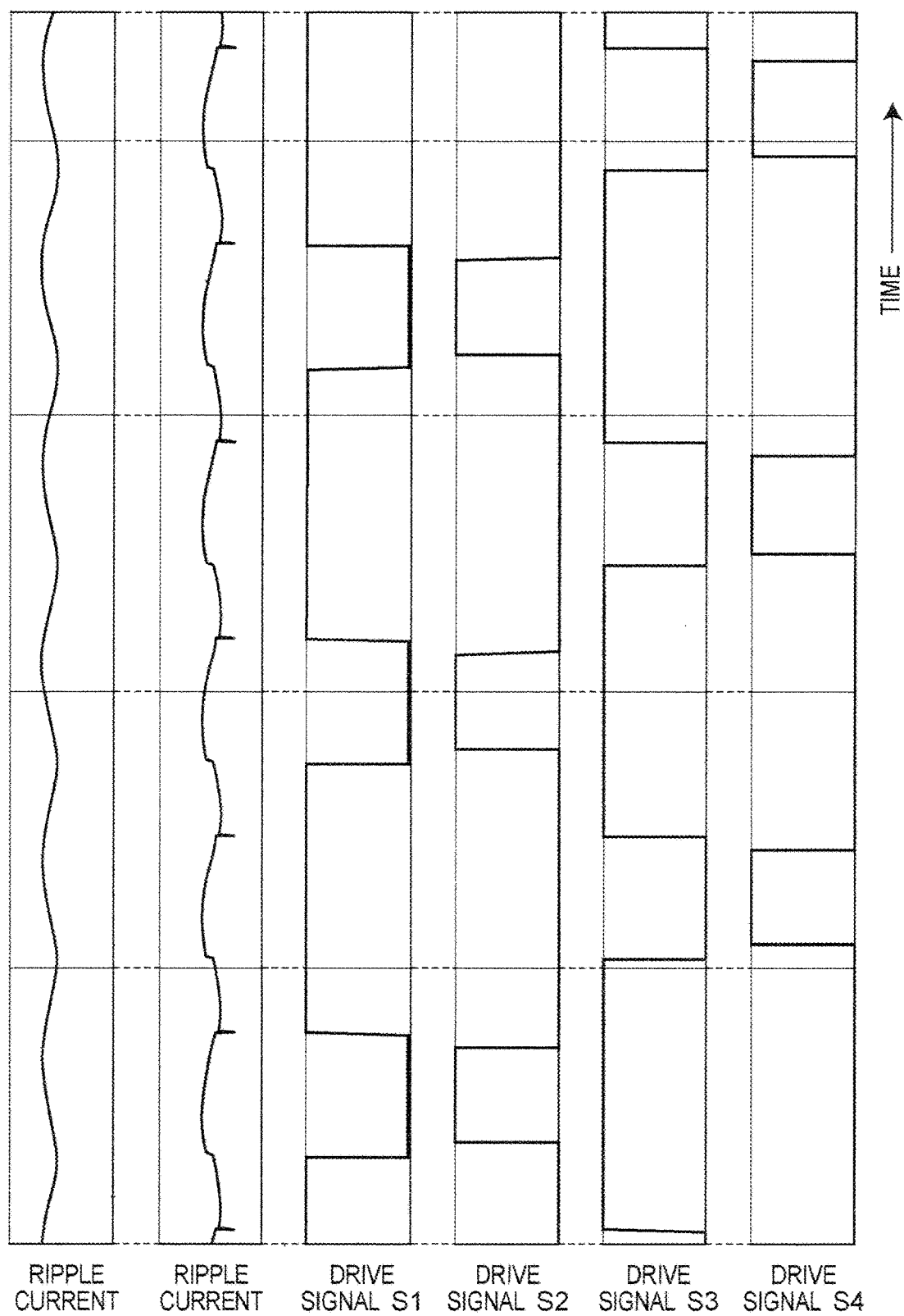
FIG. 7 is a timing chart of simulation results of the power converter apparatus of FIG. 3 and illustrating respective operation signal waveforms when a resonance frequency $f_r$ does not match twice the switching frequency $f_{SW}$ (140 kHz).
Figure 8:
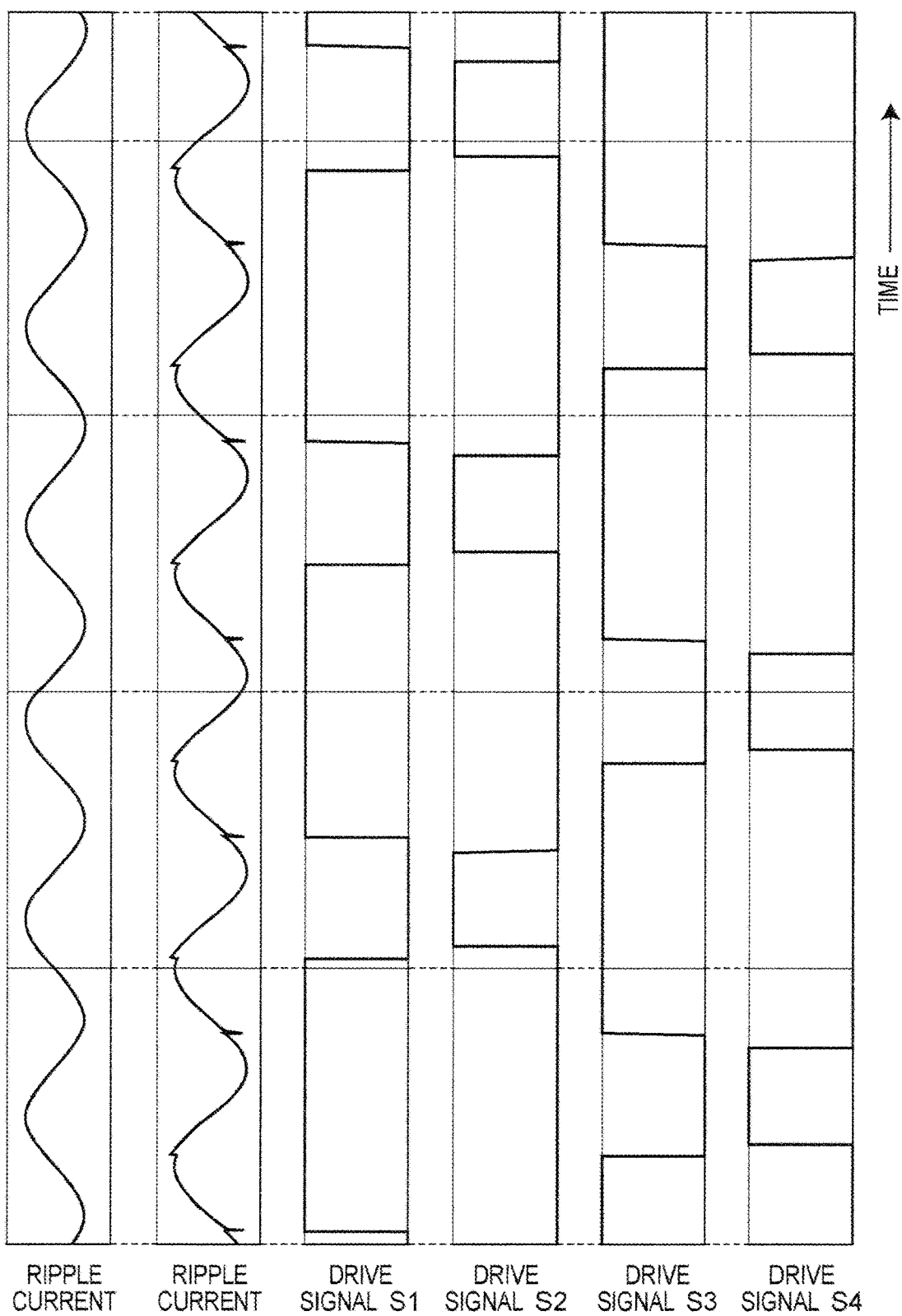
FIG. 8 is a timing chart of simulation results of the power converter apparatus of FIG. 3 and illustrating respective operation signal waveforms when resonance frequency $f_r$ matches twice the switching frequency $f_{SW}$ (140 kHz).
Figure 9:
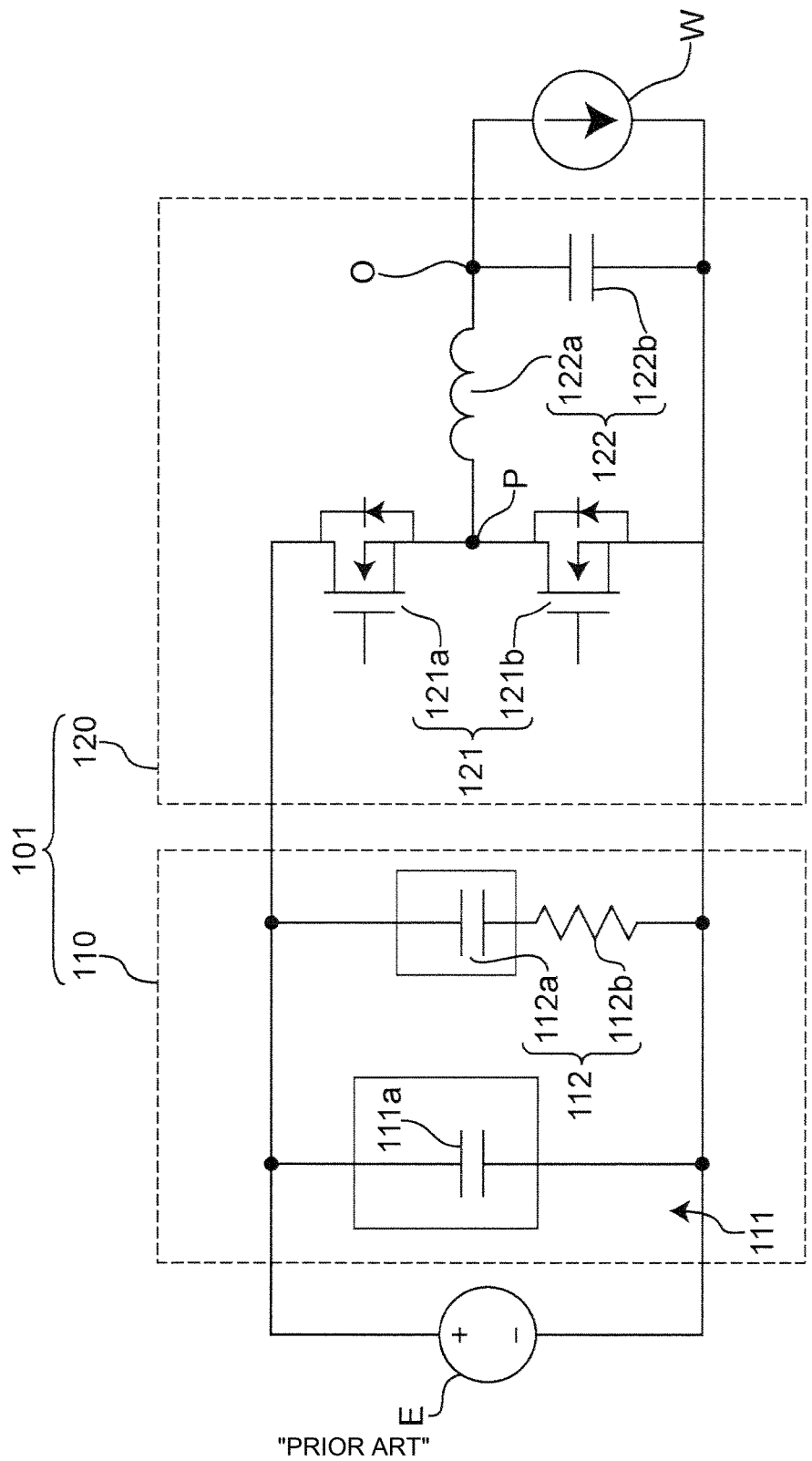
FIG. 9 is a circuit diagram illustrating a configuration of a power converter apparatus according to Conventional Example 1.
Figure 10:
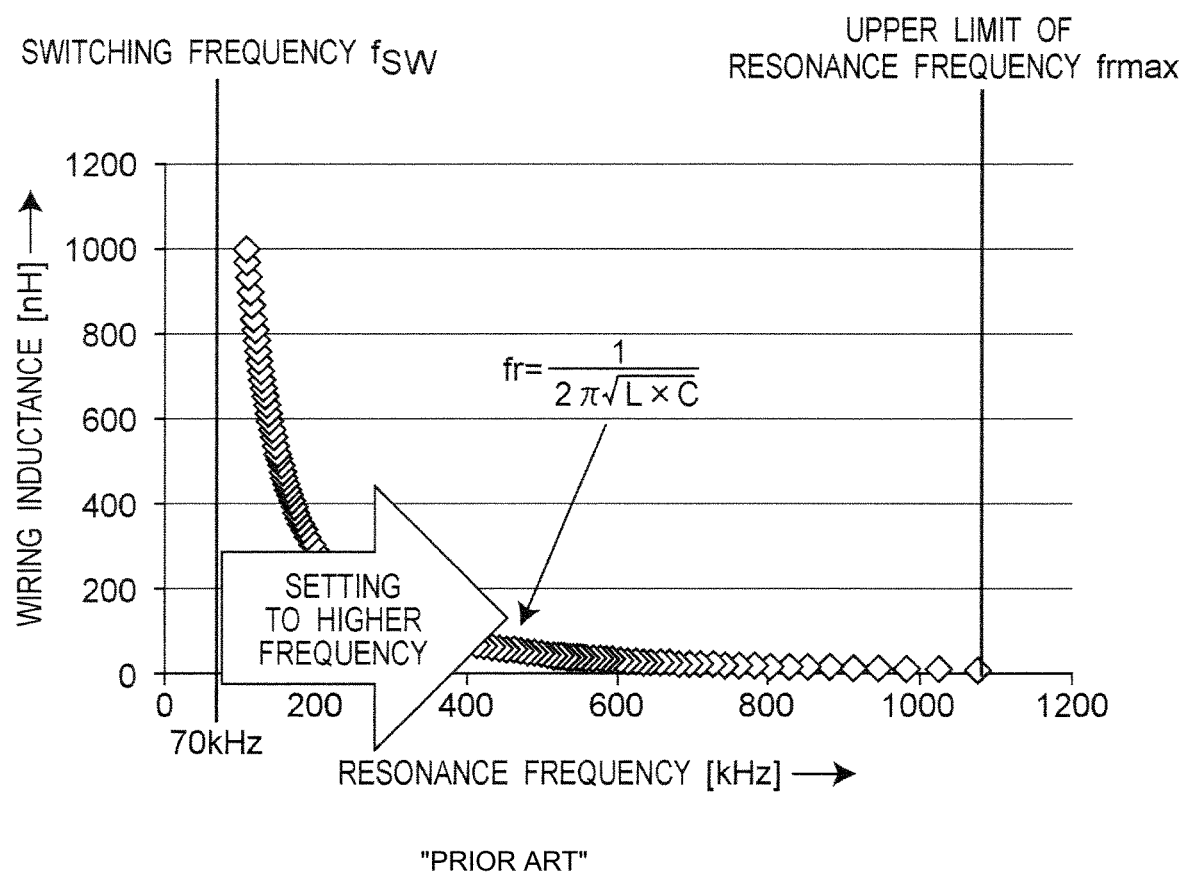
FIG. 10 is a graph illustrating a relation between the resonance frequency fr and the wiring inductance for describing a problem to be solved by the present invention.

FIG. 7 is a timing chart of simulation results of the power converter apparatus of FIG. 3 and illustrating respective operation signal waveforms when the resonance frequency $f_r$ does not match twice the switching frequency $f_{SW}$ (140 kHz). In addition, FIG. 8 is a timing chart of simulation results of the power converter apparatus of FIG. 3 and illustrating respective operation signal waveforms when the resonance frequency fr matches twice the switching frequency $f_{SW}$ (140 kHz). As is apparent from FIG. 8, it is shown that when the resonance frequency fr matches twice the switching frequency $f_{SW}$ (140 kHz), the ripple current and the ripple voltage increase. Meanwhile, it is shown that when the resonance frequency fr does not match twice the switching frequency $f_{SW}$ (140 kHz), the ripple current and the ripple voltage decrease.

Comparison with Conventional Example 1

Figure 11:
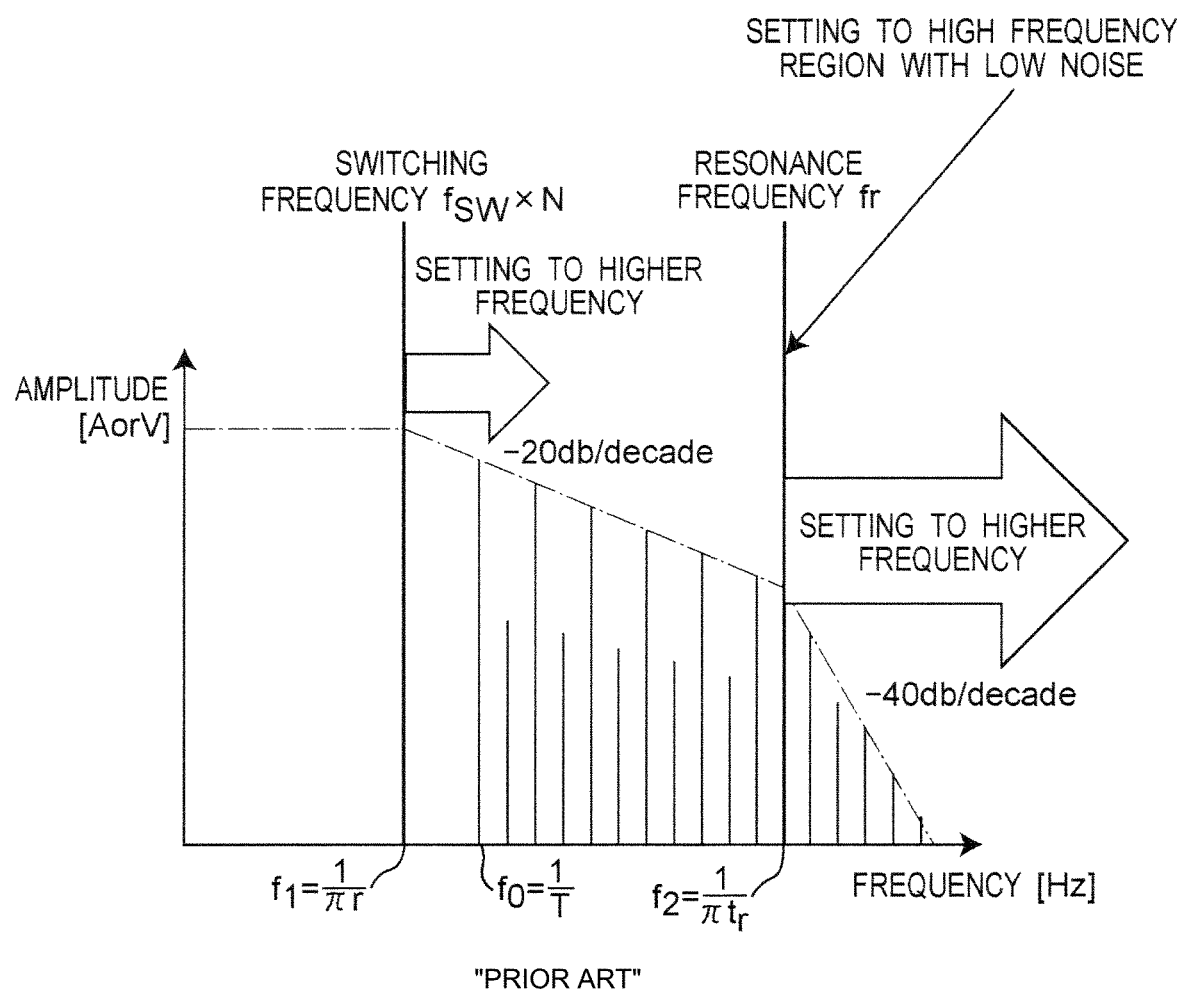
FIG. 11 is a graph illustrating a frequency characteristic of switching noise indicating a problem of a power converter apparatus according to Conventional Example 1.
Figure 12:
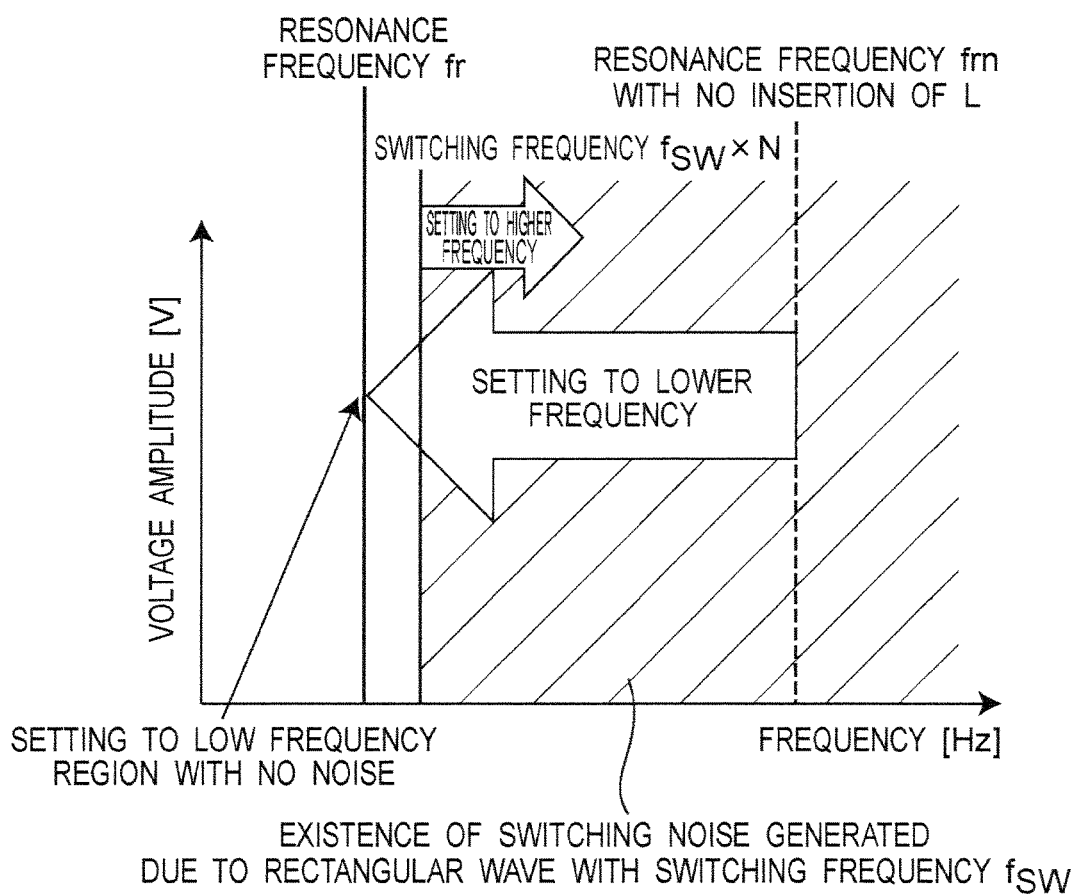
FIG. 12 is a graph illustrating a frequency characteristic of switching noise indicating an action and advantageous effects obtained by means for solving a problem according to the present embodiment.

FIG. 11 is a graph illustrating a frequency characteristic of switching noise indicating a problem of a power converter apparatus according to Conventional Example 1, and FIG. 12 is a graph illustrating a frequency characteristic of switching noise indicating an action and advantageous effects obtained by means for solving the problem according to the present embodiment.

In the power converter apparatus according to Conventional Example 1 shown in FIG. 11, a plurality of IGBTs is used for a power switching device, and the switching frequency is 20 kHz, which is relatively a low frequency. In Conventional Example 1, operation is performed in a high frequency region having a low noise level by an inductor having a relatively small inductance, the inductor connecting two bypass capacitors.

However, in the power converter apparatus according to Conventional Example 1, the power converter apparatus can be miniaturized and highly efficient by using a next-generation power semiconductor switching device (SiC or GaN) as a switching device for a switching circuit to generate a high frequency. However, as the frequency increases, the switching frequency may match the resonance frequency between the bypass capacitors. Thus, this leads to more ripples, a lower efficiency, and shorter lifetime.

In particular, in the switching circuits 10A and 10B, when the switching device in the switching circuit 10 malfunctions, the overcurrent may flow from the bypass capacitors 12 and 13. In the present embodiment, the inductors 14A and 14B having an inductance larger than that of the prior art are arranged in a forward stage of the bypass capacitor 13 having a resonance frequency lower than that of the prior art and having a capacitance larger than that of the prior art. Then the effect of the overcurrent suppression can be obtained. Meanwhile, in Conventional Example, the inductance of the inductor is smaller than the inductance in the present embodiment, and thus the effect of the overcurrent suppression is small.

Meanwhile, according to the first to fourth embodiments, by the increase in the inductance of the inductor to set the resonance frequency fr to be lower than multiple times the switching frequency $f_{SW}$, it is possible to drive it at switching frequency $f_{SW}$ at which the switching noise does not generate as illustrated in FIG. 12. Meanwhile, in Conventional Example 2, it is driven at the switching frequency $f_{SW}$ with a low noise level by a decrease in the inductance to set the resonance frequency fr to higher than multiple times the switching frequency $f_{SW}$. Although a configuration of a switching device using a next-generation power device will promote a higher frequency of the power converter apparatus. Then the noise level in a high frequency region will increase in the future, it is possible to solve these problems by using the configuration of the present embodiments to shift to a low frequency region having a small noise level.

INDUSTRIAL APPLICABILITY

As described in detail above, according to the power converter apparatus of the present invention, it is possible to avoid a complicated circuit configuration, reliably reduce switching noise in the power converter apparatus as compared with the prior art, and operate the power converter apparatus with a higher efficiency. In this case, it is possible to select a part having a relatively small ripple as a capacitor to be inserted, suppress the overcurrent by inserting the inductor, and have a radiator of the switching device smaller than the radiator of the prior art.

The invention claimed is:

1. A power converter apparatus comprising:
   at least one switching circuit configured to generate an alternating current (AC) voltage by switching a direct current (DC) voltage at a predetermined switching frequency ($f_{SW}$); and
   a filter circuit configured to convert the AC voltage from the switching circuit into a DC voltage by low-pass filtering the AC voltage, and outputs the DC voltage to a load, the filter circuit being connected to be inserted between the switching circuit and the load,
   wherein the filter circuit comprises:
   a first bypass capacitor having a first impedance, the first bypass capacitor being configured to bypass first switching noise of a first frequency component of the AC voltage from the switching circuit, and recirculate the first switching noise to the switching circuit, the first frequency component being determined by the first impedance;
   a second bypass capacitor having a second impedance, the second bypass capacitor being configured to bypass second switching noise of a second frequency component of the AC voltage from the switching circuit, and recirculate the second switching noise to the switching circuit, the second frequency component being determined by the second impedance and lower than the first frequency component of the AC voltage from the switching circuit; and
   at least one inductor inserted between the first bypass capacitor and the second bypass capacitor,
   wherein an inductance (L) of the inductor is set so that a resonance frequency ($f_r$) of the filter circuit is lower than multiple times the switching frequency ($f_{SW}$) by insertion of the inductor, thereby suppressing an overcurrent flowing through the first and second bypass capacitors, and reducing the switching noise flowing to the load.

2. The power converter apparatus as claimed in claim 1, wherein the switching frequency ($f_{SW}$) and the resonance frequency ($f_r$) are set to satisfy the following equation with a multiple number N:

$$f_{SW} \times N > fr = \frac{1}{2\pi\sqrt{L \times \frac{C_1 \times C_2}{C_1 + C_2}}}, \quad \text{[Equation 1]}$$

where $C_1$ represents a capacitance of the first bypass capacitor, and
$C_2$ represents a capacitance of the second bypass capacitor.

3. The power converter apparatus as claimed in claim 1, wherein the inductor includes at least one of a wiring inductor, a mounted inductor, and a mounted coil.

4. The power converter apparatus as claimed in claim 1, wherein the inductor includes a leakage inductance of a common mode choke coil (CMC) or at least two inductors included in a common mode choke coil (CMC).

* * * * *